United States Patent Office 3,736,280
Patented May 29, 1973

3,736,280
FUNGICIDAL COMPOSITIONS AND METHODS OF PROHIBITING THE GROWTH THEREOF
John C. Grivas, South Holland, Ill., assignor to The Sherwin-Williams Company, Cleveland, Ohio
No Drawing. Original application Oct. 13, 1969, Ser. No. 865,977, now Patent No. 3,663,616, dated May 16, 1972. Divided and this application June 1, 1971, Ser. No. 149,028
Int. Cl. C09d 5/14
U.S. Cl. 260—22 A
6 Claims

ABSTRACT OF THE DISCLOSURE

Bis (2-carbamylphenyl) disulfides are effective in controlling mildew fungi, especially *Pullularia pullulans* and can be incorporated in organic coating compositions. About 0.5–1% concentration in paint provides protection against mildew. The fungicidal compounds correspond to the structural formula:

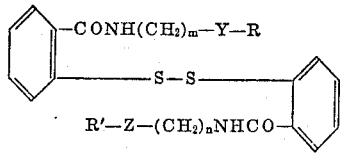

where R and R' are selected from hydrogen and methyl, $m$ and $n$ are 2 or 3 and Y and Z are O or S.

CROSS-REFERENCE TO COPENDING APPLICATIONS

This application is a division of U.S. patent application Ser. No. 865,977, filed Oct. 13, 1969, now U.S. Pat. No. 3,663,616, issued May 16, 1972.

BACKGROUND OF THE INVENTION

Mildew attack has been a continuing problem in numerous environments where the conditions of humidity and temperature are conductive to the growth of various microbial life. Most climates provide sufficient environment for growth of fungi on organic nutrient surfaces, such as plants, fibers, and coatings. One area which has received great attention is the preventing of mildew fungus growth on exterior organic coatings, especially outside building paints. These paints are applied for protective and decorative purposes over various substrates, usually wood, metal, concrete or ceramics. Painting and repainting of wood structures in houses and other buildings consumes manpower and materials in great amounts. The blemishing and deteriorating effects of various fungi on exterior coatings result in enormous maintenance problems. Because most paints are applied by brushing or spraying a liquid coating composition onto the surface, the most common method of preventing mildew is to include in the liquid a fungicidally effective amount of chemicals which kill the fungi responsible for the mildew growth.

Numerous attempts been made to increase the resistance of exterior coatings to mildew fungi. Inorganic compounds such as zinc oxide or leaded zinc oxide are useful for retarding mildew growth, but these components detract from moisture resistance on the films. One approach to the problem has been the controlled chalking of the film by addition of anatase titanium dioxide pigment; however, this caused more rapid erosion of the coating during weathering.

Because moisture is important to mildew growth, the chemical nature of the organic coating film is significant. Many hydrophobic coatings, such as silicones, vinyls, olefins, etc., are not susceptible to mildew growth because of this. Such hydrophobic films are usually cured by heating, and are not adapted to maintenance coatings. Most air-drying paints do cotain hydrophilic groups, such as carboxyl, hydroxyl, ether, or amine. These paints include the more common alkyd solvent-type, water-emulsified latex, and drying oil types.

Mildew growth on exterior organic coatings is attributed to several fungi. The relative importance of different species of fungi is climatically dependent; but, Pullularia species usually account for the major number of fungus colonies on painted surfaces in the United States. In warm, moist climates such as the Gulf areas around the 30th parallel, Pullularia species account for about 75% to over 90% of mildew growth. North of the 40th parallel this species amounts to more than half the growth. In the warmer moist areas, Alternaria species, Cladosporium species, and Penicillium species are secondary causes of discoloration. In the northern climates Aspergillus species also is a secondary mildew fungus.

A number of other micro-organisms, such as Rhodotorula (yeast), Monilia, Mucor and Botrytis, are minor causes of mildew. An organic surface that is a nutrient for some fungi may not be a nutrient for others. Generally, a nutrient for other fungi will also support Pullularia growth. Alternaria occurrence is higher in latex paints, whereas Cladosporium does not thrive on a typical latex film. Rhodotorula is associated mostly with drying oil paint vehicles and areas protected from weathering (e.g., under caves).

The preferred method for controlling mildew growth on exterior coatings is to incorporate antifungal compositions into the liquid coating material before application to the substrate. In order to achieve uniform distribution of the antifungal additives, the mixing should be performed as an industrial operation, rather than adding the fungicide in the field. For this reason chemical compatibility of the fungicide with the liquid material is important. Many fungicides lose their fungicidal activity prior to being applied in a film. This is particularly significant in latex liquid paints, which are usually alkaline. Thus, container storage life is an important criterion for selecting a paint fungicide. While small amounts of biologically active compounds may prevent deterioration of film-forming materials by anaerobic micro-organisms in a sealed can, the most important function of paint fungicides is the prevention of mildew on a nutrient surface exposed to ambient air. The weathering environment to which most exterior coatings are exposed proves to be detrimental to the biological activity of many chemical compounds.

Other chemical and physical properties to be considered for fungicide additives include animal toxicity, color, solubility (especially in water) film permeability, volatility, and odor. Mercury compounds, such as phenyl mercuric phthalate, are effective against some fungi, but harmful to humans and do not prove dependable under field conditions. Dark materials, such as cuprous oxide, cannot be used in light-colored films. Many sulfur-containing compounds, for instance mercaptans, give an unpleasant or noxious odor to the coatings. Nitrogenous compounds often interfere with drying properties of oil paints. If a fungicide is too water soluble, it may be leached from the film by condensed moisture or precipitation. If the fungicide does not migrate through the coating film, it may remain buried below the paint surface and be ineffective. The mere fact that a chemical compound is known for its activity against fungi does not mean that it will be successful for inhibiting fungal growth on exterior surface for long periods of time.

Several organic compounds have gained acceptance as exterior paint fungicides. Captan (N-trichloromethylmercapto-4-cyclohexene-1,2-carboximide) has been used for this purpose, and is effective against Pullularia and other fungi. Trans-1,2-bis(n-propylsulfenyl) ethylene (U.S. Pat. 3,199,990) is highly effective in alkyl and oil paints. 2,3,5,6-tetrachloro-4-(methylsulfonyl) pyridine is used in many latex paints as a fungicide.

Deterioration and discoloration of exterior films by microbial growth are discussed by Rothwell in the F.P.V.P.C. Official Digest, April 1958, pp. 368–376. Several fungi, yeast and bacteria species are known to cause mildew growth on exterior paints, but Pullularia has been reported as the major cause in over 95% of reported cases.

BRIEF SUMMARY OF THE INVENTION

Good activity against fungi has been discovered for certain substituted bis(2-alkylcarbamylphenyl) disulfides corresponding to the structure formula

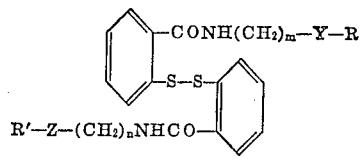

where R and R' are selected independently from hydrogen and methyl, $m$ and $n$ are whole integers from 2–3, and Y and Z are O or S.

These compounds exhibit good fungicidal properties. In serial dilution experiments, in vitro activity was observed as low as 8 p.p.m., and environmental testing of organic films containing these compounds have indicated their usefulness in inhibiting growth of important fungi found in exterior paints.

DESCRIPTION

The disulfide compounds used in the practice of this invention can be synthesized by reacting the required amount of the appropriate amine with 2,2'-dithiodibenzoyl halide. The following examples are representative of the invention, but the inventive concept is not limited to such examples. Units are expressed as parts by weight unless otherwise stated.

EXAMPLE 1

Bis[2 - (3 - methoxypropylcarbamyl) phenyl] disulfide was prepared by adding 71.3 parts of 3-methoxypropylamine dropwise with stirring to a solution of 68.7 parts of 2,2'-dithiodibenzoyl chloride in 140 parts pyridine at a temperature of 35–40° C. The solution was heated for two hours at about 90° C., cooled, and poured with stirring into 100 parts of water at ambient temperature. The precipitated solid was filtered off, washed with water and recrystallized twice from ethanol. The product, obtained in 40% theoretical yield, was bis[2-(3-methoxypropylcarbamyl) phenyl] disulfide, having a melting point of 126–127° C. The structure was confirmed by nuclear magnetic resonance studies.

Analysis.—Calculated for $C_{22}H_{28}N_2O_4S_2$ (percent): C, 58.90; H, 6.29; N, 6.25; S, 14.29. Found (percent): C, 59.34; H, 6.37; N, 6.08; S, 14.52.

EXAMPLE 2

A solution of 206 parts of 2,2'-dithiodibenzoyl chloride in 3000 parts of warm p-dioxane was added slowly with stirring to a solution of 187.5 parts of 3-amine-1-propanol in 1000 parts of p-dioxane at a temperature of 30–40°. The thick slurry was heated at 50–60° C. for two hours and cooled. The precipitated solid was filtered off, stirred in 1000 parts of water twice, filtered off and dried to give 184 parts of crude bis[2-(3-hydroxypropylcarbamyl) phenyl] disulfide. Recrystallization from ethanol gave the pure compound, melting point 170–171° C.

Analysis.—Calculated for $C_{20}H_{24}N_2O_4S_2$ (percent): C, 57.12; H, 5.75; N, 6.66; S, 15.25. Found (percent): C, 57.19; H, 5.84; N, 6.69; S, 15.53.

The MIC against *Pullularia pullulans* and *Penicillium oxalicum* was 62 p.p.m.

EXAMPLE 3

Solid 2,2'-dithiodibenzoyl chloride (206 parts) was added portionwise with stirring at 25–30° to a solution of 2-aminoethanol (146 parts) in dioxane (1000 parts). The mixture was stirred at room temperature for one hour, allowed to stand overnight, and the precipitated solid was filtered off and slurried in water (1000 parts). The solid was filtered off and recrystallized from ethanol to give bis[2-(2-hydroxyethylcarbamyl) phenyl] disulfide, M.P. 182–183° in 62% theoretical yield. Reported M.P. 184°. [H. Bushagen, Chem. Berichte, 99, 2566 (1966)].

The compound exhibited good activity against *Pullularia pullulans*.

EXAMPLE 4

Bis[2-(2-methoxyethylcarbamyl) phenyl] disulfide was prepared in a similar way to the preceding example 3 by reacting 2,2'-dithiodibenzoyl chloride with 2-methoxyethylamine. The pure compound melted at 158.5–159.5° C.

Analysis.—Calculated for $C_{20}H_{24}N_2O_4S_2$ (percent): C, 57.12; H, 5.75; N, 6.66; S, 15.25. Found (percent): C, 57.10; H, 5.56; N, 6.55; S, 15.12.

The product was active against *Pullularia pullulans* and and *Penicillium oxalicum*.

EXAMPLE 5

A solution of 40.5 parts of 2,2'-dithiodibenzoyl chloride in 300 parts of warm dioxane, was added slowly with stirring at 25–30° to a solution of 100 parts of dioxane containing 25 parts of 3-methylthiopropylamine and 25 parts of triethylamine. The mixture was then heated to 50–60° C. for two hours and cooled. The precipitated solid was filtered off, stirred in 500 parts of water to dissolve triethylamine hydrochloride, filtered off, washed with water and dried to give 41 parts of crude bis[2-(3-methylthiopropylcarbamyl) phenyl] disulfide. The pure product was obtained by recrystallization from ethanol.

Analysis.—Calculated for $C_{22}H_{28}N_2O_2S_4$ (percent): C, 54.96; H, 5.87; N, 5.83; S, 26.68. Found (percent): C, 54.98; H, 5.71; N, 5.70; S, 26.46.

Comparative tests of the substituted bis(2-alkylcarbamylphenyl) disulfides in vitro have established their usefulness in controlling growth of fungi in organic nutrient media. These tests showed that the minimum inhibitory concentration of the compounds against *Pullularia pullulans* and *Penicillium oxalicum* species was in the range of 8–1250 PPM. They were performed as follows: The samples were dissolved in small quantities of ethanol or acetone, made to volume with sterile Sabouraud liquid medium, inoculated with fungi and incubated at 25° C. for seven days. The lowest concentration (in parts per million) which inhibited the growth of the test fungi was recorded.

A controlled laboratory test used for evaluating fungicides in dry paint films is Federal Test Method, STD No. 141, Method 6271 (May 1958). This method was employed in testing the novel compounds in alkyd and latex paints of 1% concentration. These were compared to alkyd and latex dry films containing no fungicide additive (control specimen) and the results are shown as in the following Examples 6 and 7.

EXAMPLE 6

Bis[2-(3-hydroxypropylcarbamyl) phenyl] disulfide was incorporated at 1% concentration in latex paint containing the following components:

| | Parts |
|---|---|
| Acrylic resin latex (Rohm and Haas AC-388, 50% solids) | 410 |
| Pentaerythritol phthalate resin (Aroplaz 1271) | 50 |
| Alkylene glycol | 70 |
| Hydroxyethyl cellulose | 1 |
| Trialkyl phosphate plasticizer | 10 |
| Metal naphthanates | 2 |
| Anionic surfactants and emulsifiers | 29 |
| Titanium dioxide pigments | 305 |
| Alkaline earth silicate pigment | 150 |
| Alkaline earth carbonate pigment | 45 |
| Defoamer | 2 |
| Ammonium hydroxide | 2 |
| and | |
| Water | 169 |

This latex paint contained about 68 percent solids.

A normal brush coat was applied to both sides of a filter paper square in three replicates. Another batch of paint containing all aforementioned ingredients—in the same proportion—but no fungicidal disulfide was also prepared in exactly the same manner. A normal brush coat of this paint was then applied to both sides of filter paper squares in the three replicates which provided the control specimens. All the squares of the coated paper (sample and control) were then laid on agar plates in a sterile environment, inoculated with *Dullularia pullulans* and incubated at 28° C., 96% relative humidity. At 7, 14 and 21-day periods, they were examined for fungi growth. The samples containing disulfide were found completely free of fungi growth, whereas the control specimens exhibited light, moderate and heavy growth after 7, 14 and 21 days, respectively.

EXAMPLE 7

A normal brush coat of an alkyd paint containing bis[2-(3-methoxypropylcarbamy) phenyl] disulfide at 1% concentration was applied to both sides of filter paper squares in three replicates. This paint included the following components:

| | Parts. |
|---|---|
| Soya oil-modified ester of glycerol and phthalic anhydride | 340 |
| Linseed oil | 73 |
| Chlorinated paraffin resin (Chlorowax) | 91 |
| Titanium dioxide pigment | 200 |
| Alkaline earth silicate | 100 |
| Bentonite gel | 82 |
| Metal naphthenate driers | 9 |
| and | |
| Mineral spirits | 130 |

The liquid alkyd paint contained about 87 weight percent solids.

Another batch of paint containing no fungicidal disulfide was prepared exactly as described above. A normal brush coat of the paint was applied to both sides of filter paper squares in three replicates providing the control specimens.

The squares of the coated paper (sample and control) were then laid on agar plates in a sterile environment, inoculated with *Pullularia pullulans* and incubated at 28° C. and 96% relative humidity, and inspected at 7, 14 and 21-day intervals. The samples containing the fungicide were found completely free of fungi growth, whereas the control specimens showed light growth after 21 days of exposure.

A more severe test to evaluate fungicides for paints is an accelerated weathering test, which is helpful in anticipating field performance (P. A. Wolf et al., Amer. Chem. Soc. Div. of Coatings and Plastics, 25, 23 (1965)). This method was used in testing the novel disulfides as illustrated by Examples 8 and 9.

EXAMPLE 8

A 0.5% concentration of bis[2-(3-hydroxypropylcarbamyl) phenyl] disulfide in latex paint was prepared as described in Example 6. Latex paint containing no disulfide was prepared in exactly the same way. The two paints were applied in an appropriate manner, weathered for an appropriate period of time and subjected to mildew attack in a modified tropical chamber. The additive provided a significant degree of protection.

EXAMPLE 9

The aforementioned disulfide was incorporated at 1% concentration into the alkyd paint described in Example 6 and evaluated as in Example 8. The disulfide provided a significant degree of protection over the control sample.

The fungicidal disulfide compounds may be used with a wide variety of oils, resin, solvents, pigments and coating additives in formulating organic film-forming compositions having mildew resistance. The more common types of exterior coatings for which these compounds are useful as fungicides include the drying oils, alkyds and latex-type paints. The film-forming vehicles include the triglyceride esters of unsaturated fatty acids such as linseed oil or soya oil; esters of polycarboxylic acids with polyols, such as reaction products of phthalic anhydride with glycerol or pentaerythritol; oil-modified alkyds; modified phenolic resins, such as aldehyde condensations; melamine resins; synthetic elastomeric latexes; homopolymers or copolymers of olefinically unsaturated compounds, including vinyl acetates and acrylic resins; urethane resins; ether resins and numerous other conventional coating vehicles. Typical pigments which can be combined in exterior paints comprise titanium dioxide, alkaline earth carbonates and silicates, bentonite, mica, metal oxides, carbon, etc. Solvents and co-solvents are used conventionally in both organic-thinned or water thinned coating compositions, for instance, mineral spirits, polyols, benzoids, etc. Numerous additives can be incorporated in the antifungal paints for suppressing foam, for plasticizing the dried films, for emulsifying latexes, or for accelerating the film cure.

While the antifungal additive is usually incorporated directly into a coating to be applied as a top coat, some organic coatings, can be adequately protected by using the antifungal additive in a primer or intermediate coat. Migration into an adjacent layer from a substrate containing a fungicide can be an effective means for controlling mildew in some applications. A relatively higher local concentration of fungicidal agent may be necessary under such conditions. Direct application of the fungicide with an inert carrier over the organic nutrient surface may be used to protect against fungus growth, but this method may not be desirable for exterior weathered surfaces due to erosion. Some interior surfaces in food processing rooms, such as bakeries, breweries, meat packing plants, etc., also suffer from mildew growth due to extreme conditions of humidity or temperature. Here the weathering effect is not such an important factor, but the use of a fungicide is desirable.

The preferred concentrations of the disulfides in the dry coating films is from the minimum inhibitory amount to about 2 percent by weight. Greater amounts may be used, but no particular benefit is gained from using concentrations much higher than the minimum fungicidally effective amount of these compounds.

While the invention has been described by specific examples, there is no intent to limit the inventive concept except as set forth in the following claim.

What is claimed is:

1. A mildew-resistant organic coating composition containing a vehicle and a fungicidally effective amount of at least one compound having the structure:

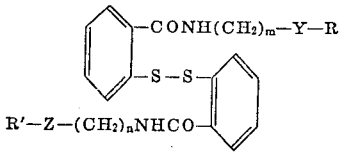

where R and R' are selected independently from hydrogen, and methyl, $m$ and $n$ are integers from 2-3, and Y and Z are O to S.

2. The coating composition of claim 1 wherein the composition contains 2,2'-bis(γ-methoxy-n-propylcarbamylphenyl) disulfide.

3. The coating composition of claim 1 wherein the composition contains about 0.5 to 2 percent by weight of 2,2'-bis(γ-hydroxy-n-propylcarbamylphenyl) disulfide.

4. A process for controlling mildew growth on a substrate which comprises coating said substrate with a liquid organic coating composition containing a vehicle and a fungicidally effective amount of at least one compound selected from the class consisting of bis[2-(3-methoxypropylcarbamyl) phenyl] disulfide and bis[2-(3-hydroxypropylcarbamyl) phenyl] disulfide.

5. A process for controlling mildew growth on a substrate which comprises coating said substrate with a liquid organic coating composition containing a vehicle and a fungicidally effective amount of at least one compound having the structure:

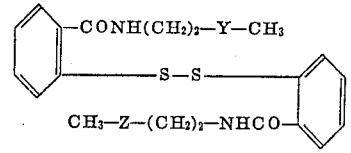

where R and R' are selected independently from hydrogen and methyl and where Y and Z are O or S.

6. A process for controlling mildew growth on a substrate which comprises coating said substrate with a liquid organic coating composition containing a vehicle and a fungicidally effective amount of at least one compound having the structure:

where Y and Z are selected independently from O and S.

References Cited
UNITED STATES PATENTS

| | | | |
|---|---|---|---|
| 3,192,057 | 6/1965 | Hines et al. | 106—15 AF |
| 3,266,913 | 8/1966 | Hardy et al. | 106—15 AF |
| 3,595,817 | 7/1971 | Deinet | 260—22 R |
| 3,642,501 | 2/1972 | Minieri | 106—15 AF |

DONALD E. CZAJA, Primary Examiner

R. W. GRIFFIN, Assistant Examiner

U.S. Cl. X.R.

106—15 AF; 117—161 K; 260—23 AR, 29.2 E, 29.6 MQ; 424—324